United States Patent
Bata et al.

[15] 3,666,903
[45] May 30, 1972

[54] FLUID LEVEL DETECTOR

[72] Inventors: George Thomas Bata; Winford Boyd Carruth; Thomas Francis Gosnell, all of Baltimore, Md.

[73] Assignee: The Bendix Corporation

[22] Filed: Nov. 23, 1970

[21] Appl. No.: 91,695

[52] U.S. Cl. ............................................200/61.05, 340/59
[51] Int. Cl. ......................................................H01h 29/00
[58] Field of Search .........................200/61.05, 84 R, 168 G; 340/244 C, 244 E, 59; 73/304 R; 174/152 G, 153 G

[56] References Cited

UNITED STATES PATENTS

| | | | |
|---|---|---|---|
| 3,343,152 | 9/1967 | Hart | 340/244 C |
| 2,926,210 | 2/1960 | Sturges | 174/153 G |
| 3,495,214 | 2/1970 | Wishart | 200/61.05 |
| 3,257,643 | 6/1966 | Jensen | 200/61.05 |
| 2,566,260 | 8/1951 | Thomson | 340/244 C |
| 3,252,420 | 5/1966 | Sorensen | 340/244 C |

Primary Examiner—David Smith, Jr.
Attorney—William N. Antonis and Plante, Hartz, Smith & Thompson

[57] ABSTRACT

A fluid level detector for use in a master cylinder to determine if the brake fluid has dropped below a predetermined level. The fluid level detector is a three piece construction with a probe being made from a conductive, anti-corrosive substance, such as carbon, that is not subject to electrolysis formations. A retaining member formed from a non-conductive, rubber-like substance is inserted through a hole in the side of the master cylinder to secure the probe in a fixed position and, simultaneously, seals the hole in the side of the master cylinder. A conductive metal piece which extends into the retainer provides a connection to the probe from the outside of the master cylinder. As the fluid in the master cylinder drops below and out-of-contact with the probe, the resistance between the probe and the master cylinder housing will approach infinity. As the resistance approaches infinity a signal will be transmitted to an indicator to alert the operator of a low fluid level in the master cylinder.

3 Claims, 4 Drawing Figures

Patented May 30, 1972

3,666,903

INVENTORS
GEORGE T. BATA,
WINFORD B. CARRUTH
BY & THOMAS F. GOSNELL

Plante, Hartz, Smith & Thompson
ATTORNEYS

FLUID LEVEL DETECTOR

BACKGROUND OF THE INVENTION

The present invention which provides a very economic, yet reliable, fluid level detector is much simpler than the previous fluid level detectors shown in the prior art. Previously, fluid level detectors were not as easily or conveniently installed as the present design, nor would they insure that no leaks would occur around the fluid level detector. One of the most common methods of fluid level detection is by use of a float maintained on the surface of the fluid. If the float drops below a predetermined point, a switch activates a circuit that indicates the fluid level is low. However, floats often times stick and are not as easily installed as the present invention. Other fluid level detectors have used reflected light or reflections from radiated energy to indicate the fluid level. These require complicated circuits and do not have the simplicity of the present design. Another common design measures capacitance between two plates with the dielectric material being the fluid between the two plates. As the fluid level drops, the capacitance increases. But again, the capacitance measuring circuits require more parts and components than the present invention.

Even though other types of resistance measuring fluid level detectors have been used, they do not have the reliability and simplicity of the present design. Over extended periods of time, the previous fluid level detectors would be subject to corrosion by the fluid, or electrolysis would form a resistance layer around the probe. This corrosion or electrolysis effect would indicate an increase in resistance which the control circuit would sense as a drop in fluid level. Also, the prior systems do not have the unitary, simple construction of the present invention. The present fluid level detector may be pushed into a hole drilled into the side of the container and, simultaneously, will seal the hole against fluid leakage. The position of the hole would be selected to locate the probe at the minimum desirable fluid level. Therefore, as the fluid level drops below the probe, resistance between the probe and the container will approach infinity.

SUMMARY OF THE INVENTION

It is an object of this invention to provide a very economical fluid level detector.

It is a further object of the present invention to provide a brake fluid level detector for use in the master cylinder to determine if the brake fluid has dropped below a predetermined point.

It is a still further object of the present invention to provide a fluid level detector of very economic construction with reliability of performance and self-sealing features.

It is another object of the present invention to provide a fluid level detector for insertion in a hole in the wall of a container which will, simultaneously, seal the hole against fluid leakage.

It is still another object of the present invention to provide a fluid level detector with a probe formed from an anti-corrosive substance that is not subject to electrolysis which increases the resistance between the probe and the fluid.

DESCRIPTION OF THE PREFERRED EMBODIMENT

Figure 1:
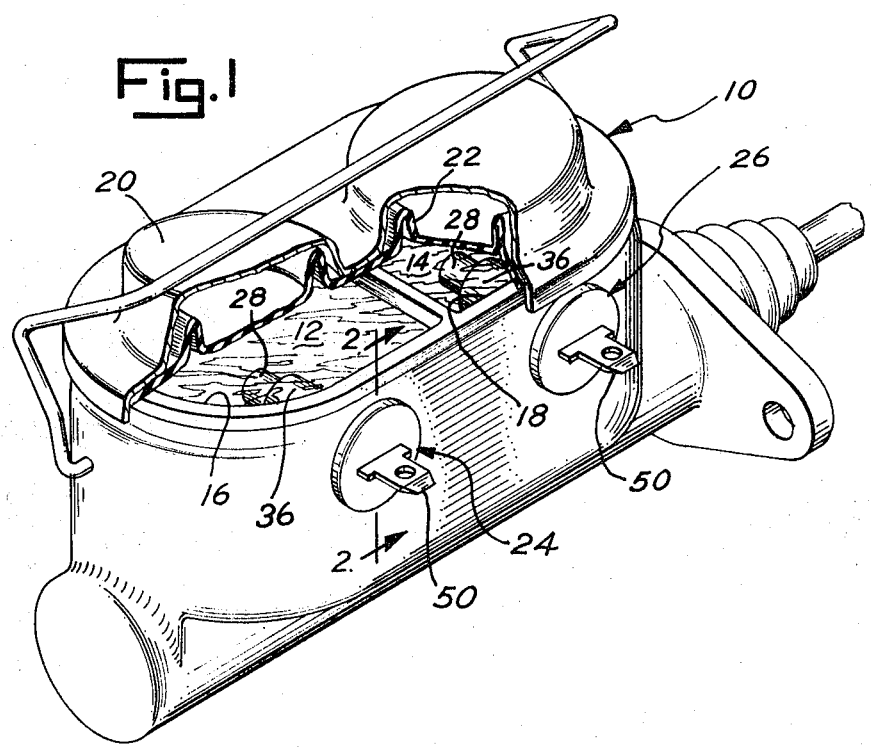
FIG. 1 is a prospective view of a brake master cylinder utilizing the fluid level detector with the cover portion cut away to show the detector immersed in brake fluid.

Referring to FIG. 1 of the drawing, there is shown a typical master cylinder, represented generally by the reference numeral 10, that may be found in most American-made automobiles. The master cylinder 10 is for a split braking system which requires two separate brake fluids, represented by reference numerals 12 and 14, for container portions 16 and 18, respectively. To prevent the loss of the brake fluid due to sloshing or evaporation, a cover 20 and a sealing diaphragm 22 fully enclose container portions 16 and 18. Two fluid level detectors 24 and 26, which are identical, are inserted through the side of the master cylinder 10 below the normal surface level of the brake fluids 12 and 14, respectively.

Figure 2:
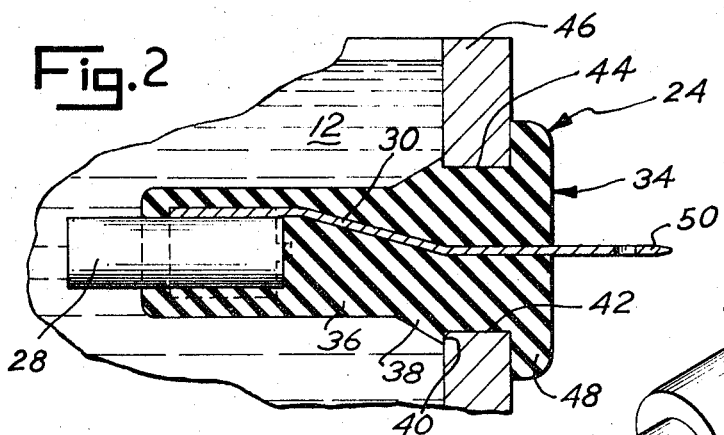
FIG. 2 is a cross-sectional view taken along line 2—2 of FIG. 1.
Figure 4:
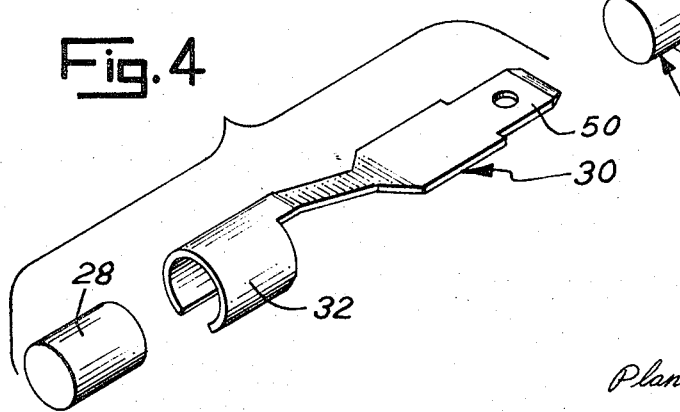
FIG. 4 is a partial assembly drawing of the fluid level detector illustrating how the probe is connected.

For more details concerning the fluid level detector, refer now to FIG. 2 which is a cross sectional view taken along line 2—2 of FIG. 1. The fluid level detector 24 is positioned in the side of the master cylinder 10 so that a probe 28 is immersed in the brake fluid 12 at the minimum desired level for the brake fluid. The probe 28 which is a cylindrical carbon bar is electrically connected to conductive connector 30 by being press fitted into a cylindrical portion 32. FIG. 4 further illustrates the manner of assembling carbon bar 28 with conductive connector 30.

Referring jointly between FIGS. 2 and 3, the enclosure of the probe and the conductive connector 30 will be explained. A rubber substance 34 is used to substantially enclose or encapsulate the carbon bar probe 28 and the conductive connector 30. A cylindrical portion 36 of the rubber substance 34 encloses and seals the connection between the probe 28 and the conductive connector 30 with only a portion of the carbon probe 28 being exposed to the brake fluid. Moving from left to right, the cylindrical portion 36 of the rubber substance is followed by a conical section 38 with the outermost tip 40 being slightly larger than a hole 42 in which the fluid level detector 24 is inserted. Following the conical section 38 is a cylindrical indentation 44 that receives and seals the wall 46 of the master cylinder 10. On the outside of the master cylinder 10 is a flexible abutting plate 48 to help secure and seal the fluid level detector 24. The connector portion 32 extends through the rubber substance 34 with a connecting tab 50 being readily available outside the master cylinder 10.

It should be emphasized that the rubber substance 34 is non-conductive and does not react with brake fluid. A similar type of rubber substance can be found in the sealing diaphragm 22. Any other substance that has the necessary resiliency for mounting and sealing, and is non-conductive, may be used instead of rubber. Also, the carbon type probe 28 is essentially non-corrosive and will not change its resistance values due to an electrolysis effect when left in brake fluid for the extended period of time. Therefore, the resistance between the probe 28 and the brake fluid will remain substantially the same. Even though the probe 28 may have resistance values in the order of several ohms, this is insignificant when compared to the high impedance values of the brake fluid 12 at low temperatures. However, once the resistance between wall 46 and connecting tab 50 exceeds a relatively large value, which is approaching infinity for all practical purposes, as detected by an external circuit (not shown), it will be assumed that the fluid level 12 has dropped below the probe 28. An example of such an external control circuit can be found in U.S. Pat. application, Ser. No. 76,932, filed on Sept. 30, 1970, having a common assignee as the present invention.

Figure 3:
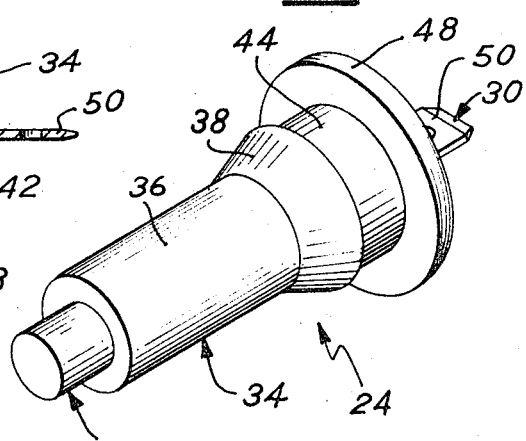
FIG. 3 is a perspective view of the fluid level detector.

Once the carbon tip probe 28 and the conductive connector 30 have been assembled, the rubber substance 34 will be molded over probe 28 and connector 30 substantially as shown in FIGS. 2 and 3. It should be emphasized that the rubber substance, though non-conductive and flexible, is strong enough to provide a structurally stable support and, simultaneously, seal hole 42 by pressing the conical section 38 against the internal portion of wall 46, pressing the cylindrical indentation 44 against the edges of hole 42, and pressing the flexible abutting plate 48 against the external portion of wall 46. Because of the structural design of the rubber substance 34, the fluid level detector 24 can be easily inserted in the side of master cylinder 10 and will, simultaneously, seal the hole 42 into which the fluid level detector 24 is inserted. Because of the three component unitary construction of the fluid level detector 24, it is very economic to manufacture and assemble in present day master cylinders.

Though the fluid level detector 24 has been shown in a master cylinder to sense the brake fluid level, it should be emphasized that the fluid level detector can be used to detect the level of a fluid in any container. The only requirements are that the fluid have some conductivity, the probe be immersed in the fluid at a point selected as the minimum fluid level, and a resistance reading be taken between the conductive container and the connecting tab 50. As the resistance exceeds a large value approaching infinity, it is assumed that the fluid level has dropped below the predetermined minimum level. If the place of insertion of the fluid level detector is other than a substantially flat wall, then the sealing portion formed by conical section 38, cylindrical indentation 40, and flexible abutting plate 48 can be re-designed to provide the same easy insertion and good seal.

We claim:

1. A fluid level detector comprising:
   probe means formed from a conductive, non-corrosive, anti-electrolysis forming substance for insertion into a fluid containing a conductive container, said probe means being a carbon bar;
   means for retaining said probe means in said container, said retaining means being a non-conductive, rubber-like substance for easy insertion in a hole in said container and thereafter preventing said fluid from leaking through said hole; and
   means for connecting said probe means to an external circuit through said retaining means, said connecting means providing an external point for measuring resistance between said probe means and said conductive container, said resistance approaching infinity as the level of said fluid drops below said probe means, said connecting means having a conductive metal piece that extends from substantially one end of said retaining means through the other end thereof, said metal piece being press fitted over one end of said carbon bar with said press fit being enclosed within said retaining means, said metal piece extending through said retaining means to provide said external point for connecting to said external circuit outside said container.

2. The fluid level detector, as recited in claim 1, wherein said retaining means is a generally cylindrical, non-conducting rubber member having a conical section followed by an indentation into which the wall of said container will securely fit, said conical section allowing easy insertion into said hole of said container, and having an abutting plate larger than said hole formed on the end thereof to help prevent leakage and secure said fluid level detector in said hole.

3. A brake fluid level detector for use in a master cylinder of a vehicular braking system, said detector comprising:
   probe means having a cylindrical carbon body, said carbon being electrically conductive without being substantially effective by electrolytic formations;
   connector means having one end secured to said carbon body and the other end joined to an external electrical circuit; and
   retaining means for encapsulating the end of said carbon body secured to said connector means, said retaining means having an external conical, cylindrical and plate sections, said retaining means being an electrically non-conductive resilient member, said retaining means being inserted through a hole in the side of said master cylinder to bring said carbon body into contact with a reservoir of electrically conductive brake fluid, said conical, cylindrical and plate sections of the retaining means resiliently engaging the housing of the master cylinder surrounding said hole to seal said hole and prevent leakage of said brake fluid from said reservoir;
   said external electrical circuit being adapted to measure electrical resistance between the carbon body and the master cylinder, said brake fluid transmitting said electrical resistance from the master cylinder to said carbon body, said electrical resistance approaching infinity if the fluid level in the master cylinder drops below said cylindrical bar.

* * * * *